United States Patent
Robinson

(10) Patent No.: US 7,226,172 B2
(45) Date of Patent: Jun. 5, 2007

(54) ILLUMINATION ATTENUATION SYSTEM

(75) Inventor: Michael G. Robinson, Boulder, CO (US)

(73) Assignee: ColorLink, Inc., Boulder, CO (US)

( * ) Notice: Subject to any disclaimer, the term of this patent is extended or adjusted under 35 U.S.C. 154(b) by 0 days.

(21) Appl. No.: 11/330,771

(22) Filed: Jan. 12, 2006

(65) Prior Publication Data

US 2006/0152687 A1  Jul. 13, 2006

Related U.S. Application Data

(60) Provisional application No. 60/593,410, filed on Jan. 12, 2005.

(51) Int. Cl.
| | |
|---|---|
| G03B 21/14 | (2006.01) |
| G03B 21/26 | (2006.01) |
| G02F 1/13 | (2006.01) |
| G02F 1/1335 | (2006.01) |
| G02F 1/1337 | (2006.01) |

(52) U.S. Cl. .............. 353/97; 353/20; 353/8; 353/30; 353/84; 349/5; 349/64; 349/127; 349/194; 349/201

(58) Field of Classification Search .......... 353/97, 353/20, 8, 30, 84; 349/5, 64, 127, 194, 201
See application file for complete search history.

(56) References Cited

U.S. PATENT DOCUMENTS

| | | | |
|---|---|---|---|
| 5,098,184 A | * | 3/1992 | van den Brandt et al. .. 353/102 |
| 5,625,495 A | | 4/1997 | Moskovich |
| 5,754,571 A | * | 5/1998 | Endoh et al. ............... 372/20 |
| 5,924,783 A | | 7/1999 | Jones |
| 6,631,997 B2 | | 10/2003 | Miyata et al. |
| 6,755,538 B2 | | 6/2004 | Sugawara |
| 6,769,777 B1 | | 8/2004 | Dubin et al. |
| 6,819,064 B2 | | 11/2004 | Nakanishi |
| 6,857,751 B2 | | 2/2005 | Penn et al. |
| 6,877,865 B2 | | 4/2005 | English, Jr. et al. |
| 6,924,923 B2 | | 8/2005 | Serati |

OTHER PUBLICATIONS

International search report and written opinion for corresponding PCT application No. PCT/US06/01175, Jan. 25, 2007.

* cited by examiner

*Primary Examiner*—W. B. Perkey
*Assistant Examiner*—Magda Cruz
(74) *Attorney, Agent, or Firm*—Baker & McKenzie LLP

(57) ABSTRACT

Provided are several apparatus and methods to attenuate illumination light in a projector. Illumination light may be attenuated by directing polarized light toward a liquid crystal (LC) attenuation panel. The panel selectively modulates some, all, or none of the polarized light passing through. The light from the panel is then directed toward a polarization device. The polarization device analyzes the polarized light, and allows or denies the light to pass therethrough based on the polarization of the light.

25 Claims, 8 Drawing Sheets

ILLUMINATION ATTENUATION SYSTEM

CROSS-REFERENCE TO RELATED APPLICATION

This Application claims the benefit of U.S. Provisional Application Ser. No. 60/593,410, filed on Jan. 12, 2005, and entitled "Illumination Attenuation System," which is commonly assigned with the present application and incorporated herein by reference.

TECHNICAL FIELD

Disclosed embodiments relate generally to projection systems, and more specifically relate to liquid crystal (LC) based attenuators for use with video projection illumination systems.

BACKGROUND OF THE INVENTION

Liquid crystal on silicon (LCoS), LCD panel, and digital micromirror device (DMD) projectors project a light image by the modulation of a light source (or lamp) using the respective (LCoS, LCD, DMD) modulation device or modulation devices. To improve sequential contrast and gray-level bit depth, it is known to attenuate the light source of a projection system in accordance with the video signal. For example, when displaying a fully black screen between video segments, ideal infinite sequential contrast could be obtained by simply turning off the lamp. Likewise in dark scenes with brightness levels only a small fraction of maximum, the output of the lamp might be reduced to improve the sequential contrast. In theory, by attenuating the light source in this way, the full bit-depth of the modulation device (or panel) can be used with a scaled luminance level to provide an increased sequential contrast. In most practical systems, however, such as in a ultra-high-pressure (UHP) mercury lamp, the light source itself cannot be intrinsically diminished in a practical way, due to speed constraints and other known difficulties, and instead an external aperture has been used to control light output.

A known "aperture" method for reducing the intensity output of a light source is the use of an electromechanical auto-iris as a dynamic aperture stop to provide active attenuation of a projection light source. FIG. 1 shows such a known mechanical auto-iris illumination system 100, in which an electromechanical device provides an auto-iris 130 with a variable aperture, having an array of curved spring-steel leaves whose orientation is determined electro-mechanically by the relative position of two rings. Illumination system 100 attenuates light from light source 102 by mechanically increasing or decreasing the aperture 132 through which the illumination passes. Auto-iris 130 is used to attenuate light source 102 achromatically to increase dynamic range of the system 100, and also to reduce the working f-stop (f/#), increasing contrast at the lower intensity settings. Dynamic range in this context describes the ability to maintain pixel gray level count at various image intensity settings, which in turn means the display has a good full gray representation for bright and dark images. Closing the aperture 132 therefore both attenuates the illuminating light and increases the working f/#, the latter also helping with contrast at any given light level, though often at the expense of uniformity. Though quite effective, mechanical components such as auto-iris 130 within illumination system 100 are prone to reliability issues, are costly, noisy, provide undesirable vibration, and have relatively slow response times.

BRIEF SUMMARY OF THE INVENTION

Described herein are illumination systems and methods in which a liquid crystal (LC) attenuation panel is used to attenuate a projection light source. In general, the described systems polarize light from a light source, use an LC attenuation panel to modulate the light, and pass the modulated light through a polarizer, whereby some portion of the light is blocked by the polarizer according to the modulation applied by the LC attenuation panel. The modulation of the LC attenuation panel thereby is used to control the illumination to achieve desired sequential contrast in a projection system or for other desired goals in the projection or other system. In addition to the described attenuation in a projection system, the attenuation techniques described herein may be used, for example, in chromatic and achromatic analog devices, achromatic quantized spatial switches, and achromatic analog spatial devices. A specific described embodiment of a system using such LC-based attenuation panels is that of replacing electromechanical auto-irises in projection systems that attenuate fixed-intensity ultra-high-pressure illumination sources. The described systems and techniques accordingly can be used to improve sequential contrast and dynamic range of projection displays, or in other display panels using fixed-intensity light sources. The described embodiments may be used to effectively and substantially reduce response times, cost, power, and/or noise relative to known systems of light source attenuation.

In a first set of embodiments, an illumination system for a projector includes a light source, a first polarizer, a first lens, a LC panel, a second lens, and a second polarizer. The first polarizer is operable to receive light from the light source and to polarize the received light. The first lens is positioned to receive the polarized light and is operable to direct the polarized light on a light path toward the second lens. The LC panel may be located at various positions between the first polarizer and the second polarizer. The second polarizer is operable to analyze the processed light. In some such embodiments, the LC attenuation panel may include a plurality of LC attenuation portions. Each LC attenuating portion may be selectively operable in an attenuation state or a non-attenuation state, in which the light passing through the portions in attenuation state is polarized orthogonally to light in non-attenuation state. The second polarizer may allow light in the non-attenuation state of polarization to pass but may not allow light in the attenuation state of polarization to pass. Thus, by controlling which portions of the LC attenuation panel are in attenuation state and non-attenuation state, the amount of light passing through the system can be controlled.

In another set of embodiments, a LC attenuation panel may be an analog LC panel that is operable to uniformly process the polarization of light passing through it, thereby controlling the level of transmission in a light path by attenuating all rays nearly equivalently.

In yet another set of embodiments, a LC attenuation panel may combine an analog attenuation approach with a spatial attenuation approach. In such embodiments, a LC matrix attenuation panel including a matrix of coarse pixels that are individually addressable with analog values, providing independent modulating regions.

Also disclosed is a LC panel for attenuating light in an illumination system for a projector including at least one LC attenuating portion. Each of the at least one portion is selectively operable in an attenuation state or a non-attenuation state, such that the LC attenuating portions in the attenuation state polarize light to a first state of polarization.

Also disclosed is a method of attenuating light in an illumination system for a projector. This method includes the step of receiving light at a first polarizer. In another step, the received light is polarized with the first polarizer to generate polarized light. In yet another step, portions of a LC attenuation panel are biased. In an additional step, the state of polarization of the polarized light passing through the biased attenuation portions is orthogonally transformed. In yet another step, polarized light is analyzed by a second polarizer to prevent the orthogonally polarized light from passing.

Also disclosed is a method for controlling the output of an illumination system. Generally, the method includes the step of receiving video information. An optional step includes measuring the output illumination. Another step includes determining whether the light source requires attenuation. If the light source requires attenuation, then another step includes calculating an amount of attenuation required. Further, if the light source requires attenuation, a step includes providing a control signal to an LC attenuation panel.

BRIEF DESCRIPTION OF THE DRAWINGS

For a more complete understanding of the principles disclosed herein, and the advantages thereof, reference is now made to the following descriptions taken in conjunction with the accompanying drawings in which.

DETAILED DESCRIPTION OF THE INVENTION

Figure 1:
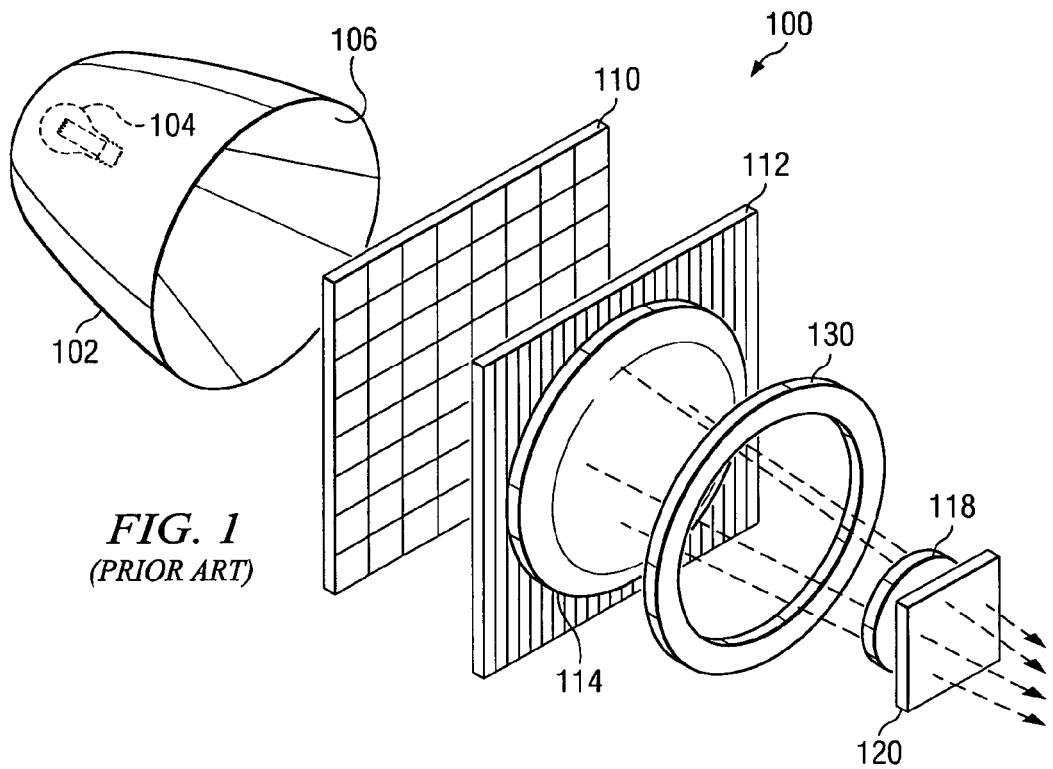
FIG. 1 illustrates a known mechanical auto-iris illumination system.
Figure 2:
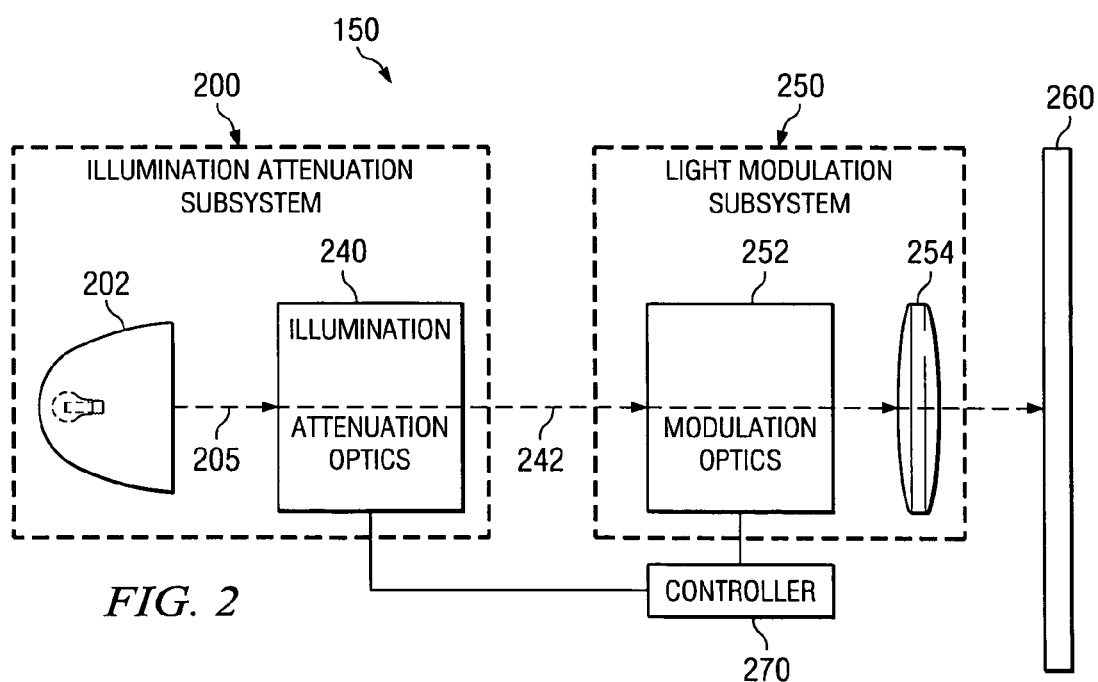
FIG. 2 provides a schematic diagram of a projection system.

FIG. 2 illustrates a schematic diagram of a projection system 150. Projection system 150 includes an illumination attenuation subsystem 200 optically coupled to a light modulation subsystem 250. Projection system 150 may also include a controller module 270 coupled to the illumination attenuation subsystem 200 and light modulation subsystem 250.

The illumination attenuation subsystem 200 is located in the light path of projection display system 150 ahead of a light modulation subsystem 250. The illumination attenuation subsystem 200 is operable to attenuate the light 205 from the light source 202 according to image characteristics. The illumination attenuation subsystem 200 includes an attenuation control input in communication with an image controller in controller module 270. The illumination attenuation subsystem 200 also includes a liquid crystal panel in illumination attenuation module 240 that may modulate light in the light path. The illumination attenuation subsystem 200 may further include a liquid crystal panel controller connected to the liquid crystal panel and the attenuation control input, or alternatively, the liquid crystal panel controller may be located in controller module 270. The light modulation subsystem 250 of the projection control system communicates with an image controller in controller module 270 that provides the images to be displayed by the projection system 150.

Generally, in operation, illumination attenuation subsystem 200 provides a light source 202 that provides illumination light over a light path 205 to illumination attenuation module 240. Illumination attenuation module 240 may generally polarize light from light source 202, and use a liquid crystal (LC) attenuation panel to modulate the light, with a polarization device to analyze the modulated light, thereby preventing a fraction of the illumination from passing, and controlling the output illumination of light over light path 242 as appropriate. A modulation optics module 252 receives the light and may modify and process the light from the illumination attenuation subsystem 200 for output to a projection surface 260 via projector lens 254. The modulation optics module 252 generally may modulate the light 242 to impart image information using a light valve, an LCoS panel, an LCD panel, or other techniques known in the art. Additionally, controller module 270 may control the operation of the illumination attenuation subsystem 200 and/or the light modulation subsystem 240. It will be appreciated that controller module 270 may comprise circuitry and/or a combination of hardware and software to control illumination attenuation subsystem 200 and light modulation subsystem 250. An exemplary process that controller module 270 may employ is described below with reference to FIG. 11.

It will be further appreciated that illumination attenuation subsystem 200 may be used in various projection devices to provide a desired sequential contrast, for example, in projection-based displays in front-projection mode, where the viewer and projector are on the same side of the projection surface 260, and rear-projection mode, where the viewer and projector are on opposite sides of projection surface 260. Additionally, the concepts described herein may be utilized in controlling illumination to instrument displays, such as direct-view displays, and head-up displays, where ambient light conditions are continuously variable.

Figure 3:
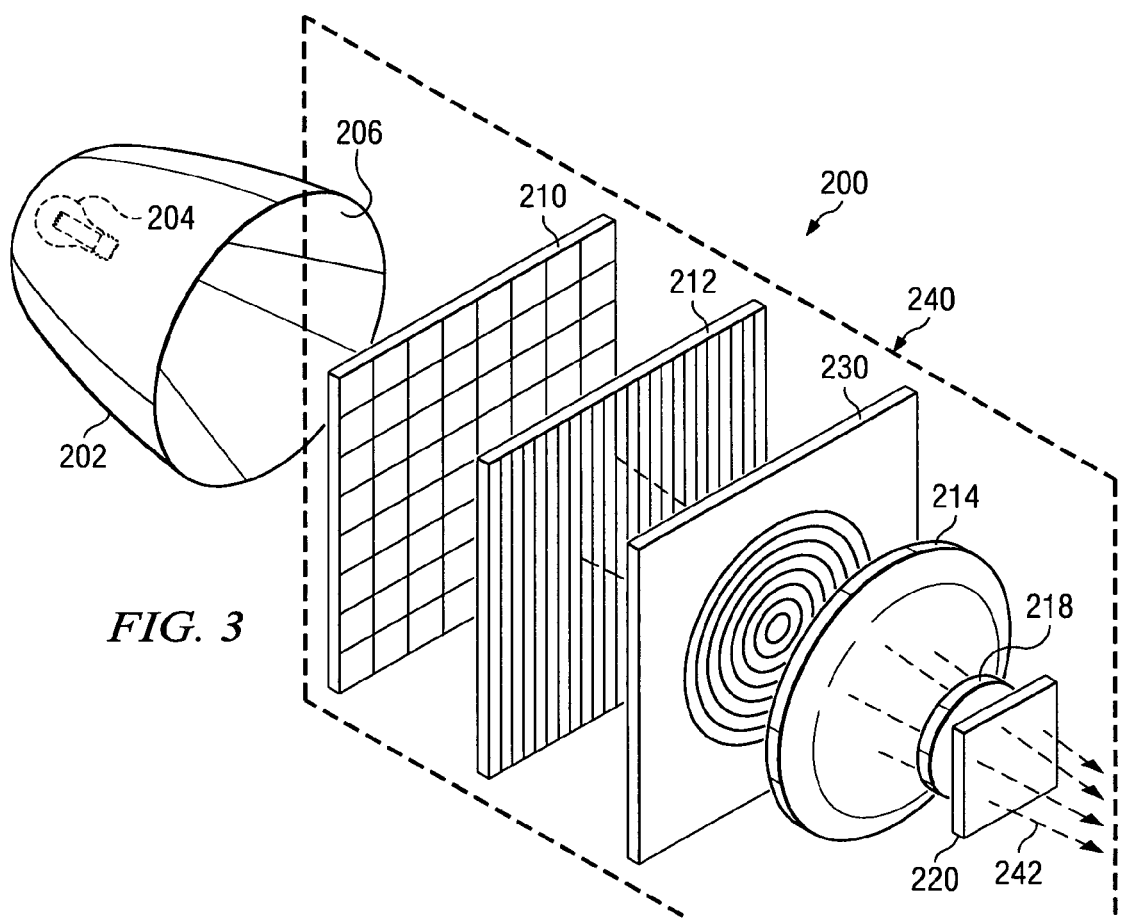
FIG. 3 provides a perspective view of an embodiment of an illumination attenuation system with a patterned liquid crystal attenuation panel, and FIGS. 3A and 3B provide illustrations of patterning with concentric annuli in different configurations.

FIG. 3 illustrates a first embodiment of the illumination attenuation system 200 for a projector that uses a LC attenuation panel 230 to attenuate the illumination. The illumination attenuation system 200 includes a light source 202, a lens array 210, a polarization conversion system (PCS) 212, a LC attenuation panel 230, a combining lens 214, a telecentric field lens 218, and an entrance polarizer 220.

The light source 202, includes ultra-high-pressure (UHP) lamp 204, located inside a parabolic or elliptical reflector 206. Brightness of a UHP lamp 204 is determined by input electrical power and arc gap. Light from the light source 202 is typically collected by a parabolic or elliptical reflectors 206, for use with the lens array 210.

The lens array 210 is used to create a uniform-and efficient illuminator in the projection system. Lens array 210 is exemplary of the type of lens device that can be used, but other lens configurations can be used, such as arrays of cylindrical lenses, diffractive lens, prismatic lenses or focusing lenses based on total internal reflection. Other structures having the functionality of lens array 210 could be used, such as arrays of tapered light guides having focusing functionality based on total internal reflection.

PCS 212 provides light exiting with substantially the same polarization. Thus, PCS 212 may include a linear array of polarizing beam splitters (PBSs), or another polarization device such as a wire grid polarizer. In an embodiment that uses a PBS, the PCS 212 separates the light beams from the lens array 210 into different orthogonal polarizations (e.g., S-polarized light and P-polarized light). This can be accomplished with a polarization separating surface for each polarization converter element that reflects one light polarization and transmits the other. The reflected state is then reflected again along the optical axis and transmitted through a half-wavelength retardation plate, typically affixed to the exit surface of the array of PCS 212. This results in nearly all the light exiting each polarization converter element with the same polarization.

In operation, achromatic light is generated by UHP light 204 and reflects from parabolic reflector 206 through the lens array 210 onto polarization conversion system (PCS) 212. An array of images is created by the lens array 210 which is incident on PCS 212. A combining lens 214 after the PCS 212 directs the polarized light on a light path toward telecentric field lens 218, which directs light through entrance polarizer 220.

In some embodiments, LC attenuation panel 230 may be placed between PCS 212 and combining lens 214. Placing the LC panel 230 closely sandwiched between PCS 212 and lens 214 is preferable with such spatial attenuation techniques because it minimizes non-uniformities resulting from angular dependent component performance. In other embodiments, however, LC attenuation panel 230 may be located elsewhere on the light path between PCS 212 and polarizer 220, for example, at an aperture stop position between combining lens 214 and telecentric lens 218. To enforce telecentricity, a field lens 218 is located at a focal length from combining lens 214. As used here, telecentricity is the condition where the principal ray from any point in the object is parallel to the optic axis. This requirement is necessary in most LC projection systems as it avoids any non-uniformity resulting from angular dependent component performance. Entrance polarizer 220 follows telecentric field lens 218 in order to analyze the polarized light.

Figure 3A:
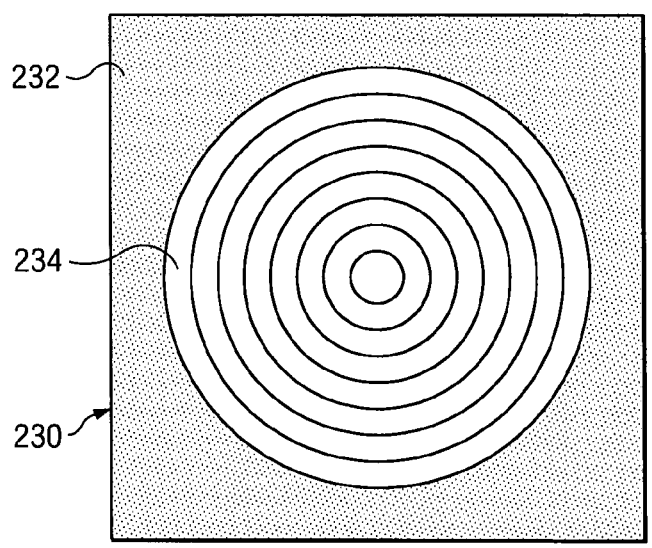
Figure 3B:
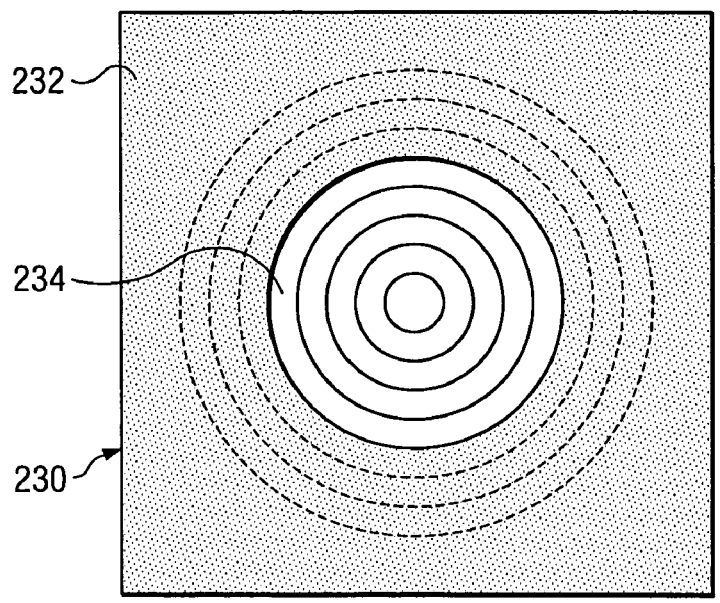
Figure 9A:
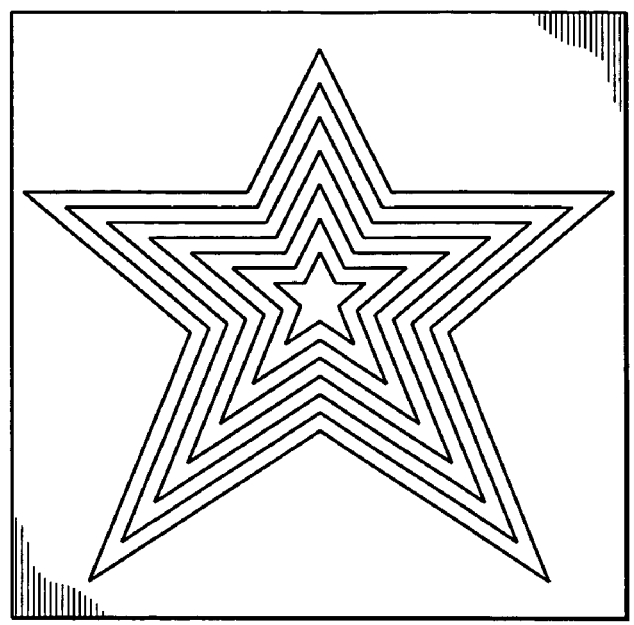
FIGS. 9A to 9C provide additional liquid crystal attenuation panel profiles.
Figure 9B:
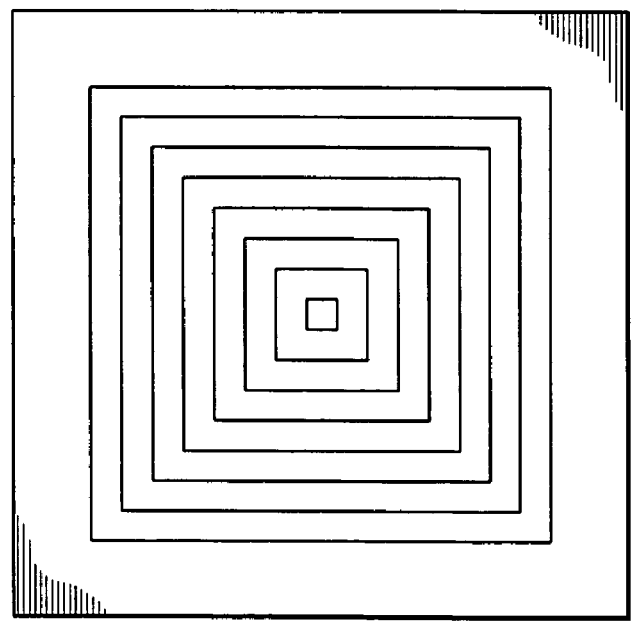
Figure 9C:
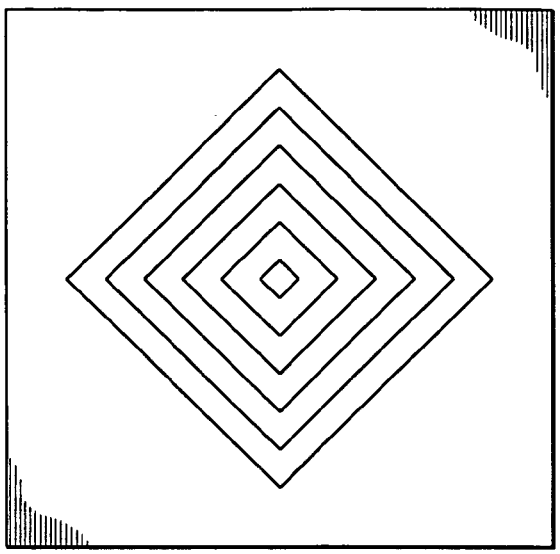

In this described embodiment, the LC attenuation panel 230 comprises concentric circles defining annuli regions about a common center, that may be sequentially switched between white and black. FIGS. 3A and 3B show some exemplary configurations of LC attenuation panel 230. FIG. 3A shows 'black' attenuation portion 232 represented by a shaded area and a 'white' non-attenuation portion 234 which is not shaded. In comparison to FIG. 3A, FIG. 3B shows a larger 'black' attenuation portion 232 and a smaller 'white' non-attenuation portion 234. Thus, the configuration of attenuation portions in FIG. 3A serve to allow more light through the illumination system than the configuration shown in FIG. 3B. FIGS. 9A to 9C illustrate some exemplary panel designs which may be used in place of the concentric circle design. The black regions of the LC attenuation panel are more strictly regions where the polarization state of the light is modulated from one that is primarily linearly polarized, courtesy of the PCS 212, to its near orthogonal state, whereas the polarization of the light passing through the white regions is substantially unmodulated. The light in the orthogonal state that has passed through the black region of the LC attenuation panel 230, is removed from the system 200 at the entrance polarizer 220 following the telecentric field lens 218. The extent to which the light passing through the black region of the LC attenuation panel 230 depends on the extent to which the polarization out of the PCS 212 is polarized. For example, PCS 212 seldom achieves greater than 90% polarization purity, implying that the attenuation will only be down to a 10% level. This should be sufficient in most cases, but a further input polarizer device could be inserted, as appropriate, to improve the polarization purity thereby improving attenuation. An additional polarizer device (in addition to entrance polarizer 220) would allow the LC attenuation panel 230 to operate in un-polarized systems such as those employing a DMD-based projector modulator. In this latter case, though, a 50% insertion loss would be automatic even with ideally operating polarizers and LC devices.

If the LC attenuation panel 230 is placed at an aperture stop position of the illumination attenuation system 200 or the aperture stop of a projector, it may be particularly exposed to high intensity illumination. To avoid degradation of the organic LC and its alignment layers, an inorganic alignment method such as evaporated $SiO_x$ may be used, which has become common in vertically aligned nematic (VAN) mode LCoS panels. In this exemplary embodiment, a vertically aligned mode is favored, with a 90° twist being used to avoid residual retardance and leakage in its off-state. Dislocations associated with vertically aligned twisted nematic (VATN) liquid crystal modes are minimal since coarse patterning is employed and reverse twisting caused though in-plane electric fields is sparse.

Some attractive advantages of using the solid-state LC attenuation panel 230 include the absence of mechanical parts, increasing reliability and speed in switching between attenuation modes. Quick response allows near complete shut off of the light when the video signal is removed. This is particularly attractive in projection systems that have a non-uniform colored dark state, since it prevents the viewer witnessing an unexpected, seemingly poor image quality, which in effect does not significantly degrade video imagery. Additionally, in contradistinction to mechanical auto-irises, the LC attenuation panel 230 is silent in operation, has no vibration, has a lower power consumption, and is relatively inexpensive to produce.

Not all of the elements illustrated in FIG. 3 would necessarily be included in all implementations. Some implementations would include additional elements not illustrated. For example, in an alternative embodiment, a second lens array (not shown) may be positioned in the light path between the first lens array 210, and the PCS 212, providing two identical arrays of lenses, matched in aperture ratio, which are located one focal distance apart. Thus, an array of images is created by the first lens array 210 in the plane of the second lens array. Each source image is incident on a single element of the second lens array. PCS 212 may be incorporated immediately before or immediately after the second lens array. A combining lens 214, placed directly after the second lens array (or PCS 212), acts to map the light onto telecentric field lens 218, which directs light through entrance polarizer 220. LC attenuation panel 230 is located on the light path between PCS 212 and entrance polarizer 320, at one of several possible locations (e.g., sandwiched between PCS 212 and lens 214, or after lens 214, etc.). To enforce telecentricity, a field lens 218 is located at a focal length from combining lens 214. Entrance polarizer 220 follows telecentric field lens 218 in order to analyze the polarized light.

Figure 4:
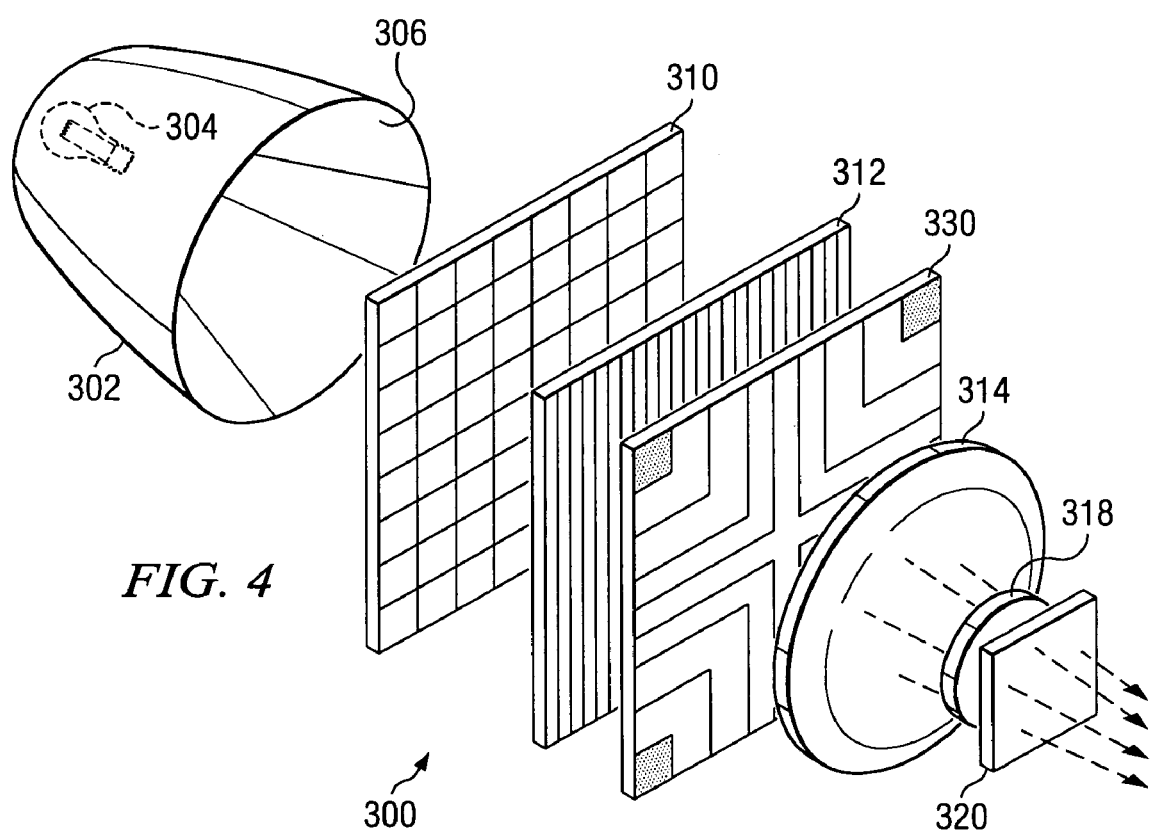
FIG. 4 provides a perspective view of another embodiment of an illumination attenuation system with another patterned liquid crystal attenuation panel, and FIGS. 4A and 4B provide illustrations of another patterning scheme in different configurations.

FIG. 4 shows a second embodiment of an illumination attenuation system 300, in which an LC attenuation panel 330 has a pattern that acts to attenuate gradually from the corners. In this second embodiment, the elements comprising the illumination attenuation system 300 and their configuration share similarities, except that a cross-patterned LC panel 330 is used instead of a concentric circle panel 230. Accordingly, in this second embodiment, light source 302 is similar to light source 202 of FIG. 3, lens array 310 is similar to lens array 210, and so on. Likewise, LC attenuation panel 330 may be located at various positions between PCS 312 and polarizer 320. In this exemplary embodiment, LC attenuation panel 330 is located between PCS 312 and combining lens 314.

Figure 4A:
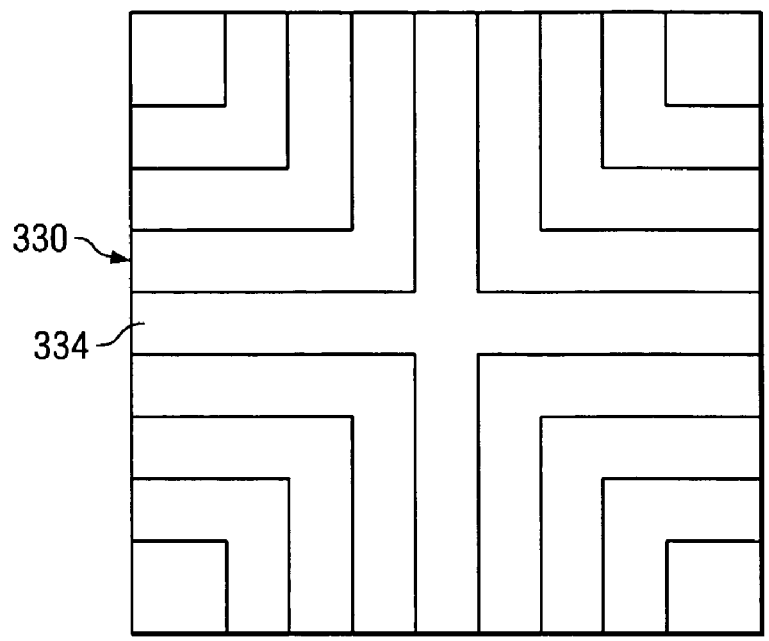
Figure 4B:
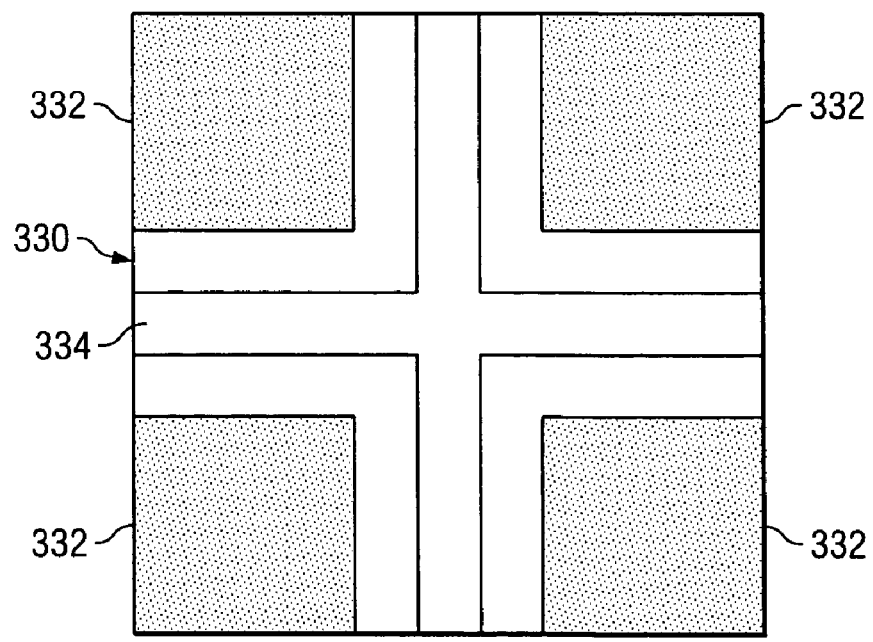

As shown in more detail with reference to FIG. 4A, the LC attenuation panel 330 may have patterned attenuation portions, including a central cross region, with concentric L-shaped regions extending outward from the center. The exemplary configuration shown in FIG. 4A has attenuation portions which are configured in a non-attenuation state, as shown by the non-attenuation portion 334. In comparison, the exemplary configuration shown in FIG. 4B includes some attenuation portions configured with an attenuation state shown by shaded regions 332, and other portions configured with a non-attenuation state, shown by the non-shaded region 334.

Many optical devices are sensitive to skew rays that reduce contrast in the projection system due to geometrical rotation of the polarizing axis. Thus, this exemplary embodiment provides an illumination attenuation system 300 that minimizes skew rays in the 135°/45° azimuthal planes, thereby preventing leakage. In this embodiment, the patterned LC attenuation panel 330 can reduce such skew rays by clipping out the corners of a normally circular pupil. This has the benefit of greater contrast at any given attenuation setting when compared to the embodiment of FIG. 3, since skew rays in the 135°/45° azimuthal planes are those that cause most leakage. Preferably, light from an integer number of lens elements of lens array 310 is incident on each patterned attenuation portion of the LC attenuation panel 330. In other words, each source image from lens array 310 is entirely incident on a patterned attenuation portion of LC attenuation panel 330.

This embodiment has an additional advantage that the electrical connections for applying electrical power to the various regions of the LC panel may be situated along the edges of the panel, simplifying connections to controlling circuitry since it does not require routing of electrical conductors between portions of liquid crystal.

It will be appreciated that in another embodiment (not shown), the illumination light can be narrowed more in one axis than another axis for applications such as HDTV, where there is a 16:9 aspect ratio, or even conventional displays having an aspect ratio of 4:3. This can be achieved by modifying the pattern with a different vertical attenuation ratio from the horizontal attenuation ratio e.g., providing f/#2.5 vertically, and f/#4.0 horizontally.

Figure 5:
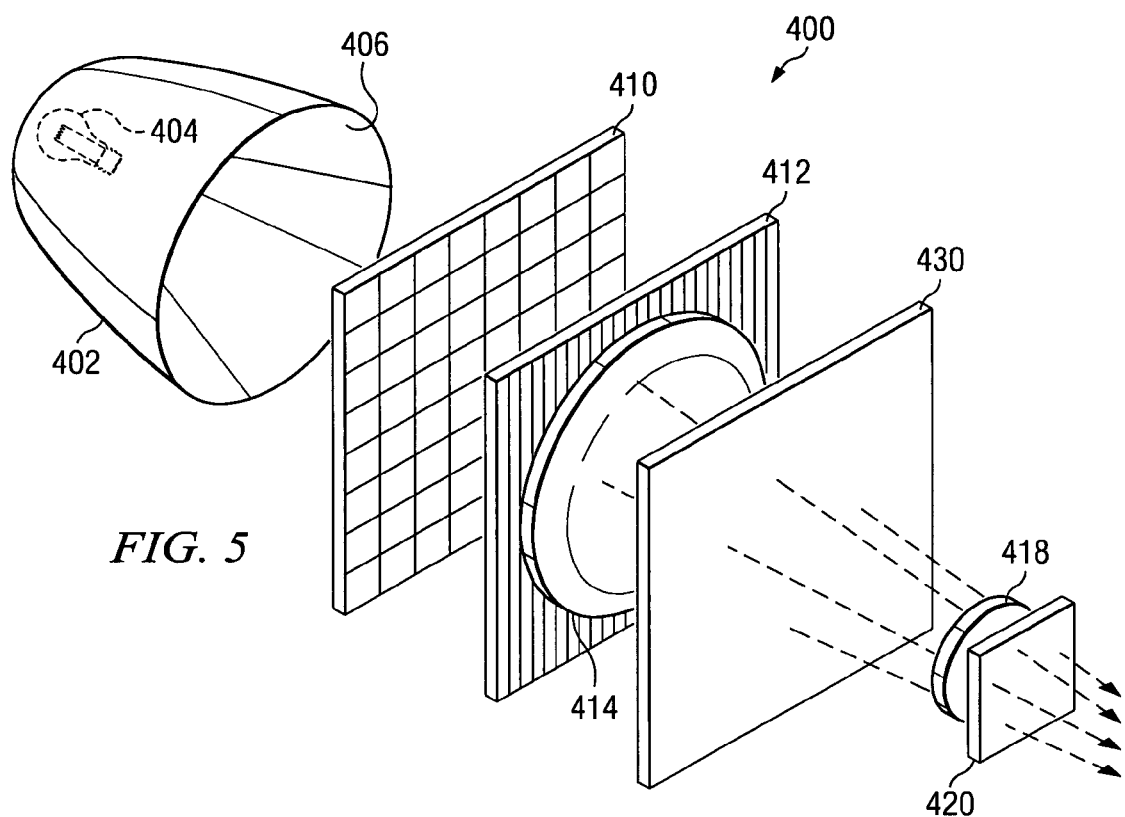
FIG. 5 provides a perspective view of another embodiment of an illumination attenuation system, which utilizes an analog liquid crystal attenuation panel.

FIG. 5 shows a third embodiment of an illumination attenuation system 400, which utilizes an analog LC attenuation panel 430. In this third embodiment, the elements comprising the illumination attenuation system 400 share some similarities with the illumination attenuation system 200 of FIG. 3, except that analog LC attenuation panel 430 is used in place of concentric circle panel 230. Accordingly, in this third embodiment, light source 402 is similar to light source 202 of FIG. 3, lens array 410 is similar to lens array 210, etc. It should be appreciated that the analog LC panel 430 may be placed in the light path just before or after the telecentric field lens 418, and before the polarizer 420.

Unlike the binary-addressed patterned set of embodiments shown with reference to FIGS. 3 and 4, that spatially attenuate light from light source 402, the analog LC attenuation panel 430 controls the level of transmission in a light path by attenuating all rays nearly equivalently, therefore providing a uniform attenuation of the light source 402. Accordingly analog LC attenuation panel 430 is less dependent on angular performance, and therefore may be positioned closer to telecentric lens 418 without significantly affecting attenuation performance. Positioning panel 430 close to lens 418 allows a reduction in the analog LC panel's 430 size and cost, as well as the amount of space required by this illumination attenuation system 400. Analog LC Panel 430 may also be placed in other locations, such as between PCS 412 and combining lens 414, though doing so will require a larger, more expensive LC panel 430.

Analog LC attenuation panel 430 may be a binary LC device with an on and an off state, or the Analog LC attenuation panel 430 may provide analog modulation with a plurality of optical states of the device. This analog operation allows control of the illumination and color as a function of modulation. Analog LC attenuation panel 430 may also correct the light source to remove characteristic spikes of color, such as the 580 nm yellow spike. The Analog LC attenuation panel 430 may be optimized for fast response times, providing a very high frame rate operation including fast refresh rates (e.g., 20 kHz).

Since this device attenuates all of the incident rays substantially equally, rather than some of the rays (i.e., as with the spatial attenuation devices described above in FIGS. 3 & 4), the analog performance provides the advantage of hiding temporal transition artifacts as seen by the viewer. At lower intensity settings, however, the LC attenuation panel 430 may introduce chromaticity thereby requiring correction of chromatic levels through modulation in additional LC panels, e.g., LCoS panels following the illumination attenuation system 400. Such unacceptable chromatic transmission effects may be offset by controller module 270 of FIG. 2 using RGB panel modulation techniques, using offset values stored in look-up tables, or using corrective DSP techniques that are known in the art.

Figure 6:
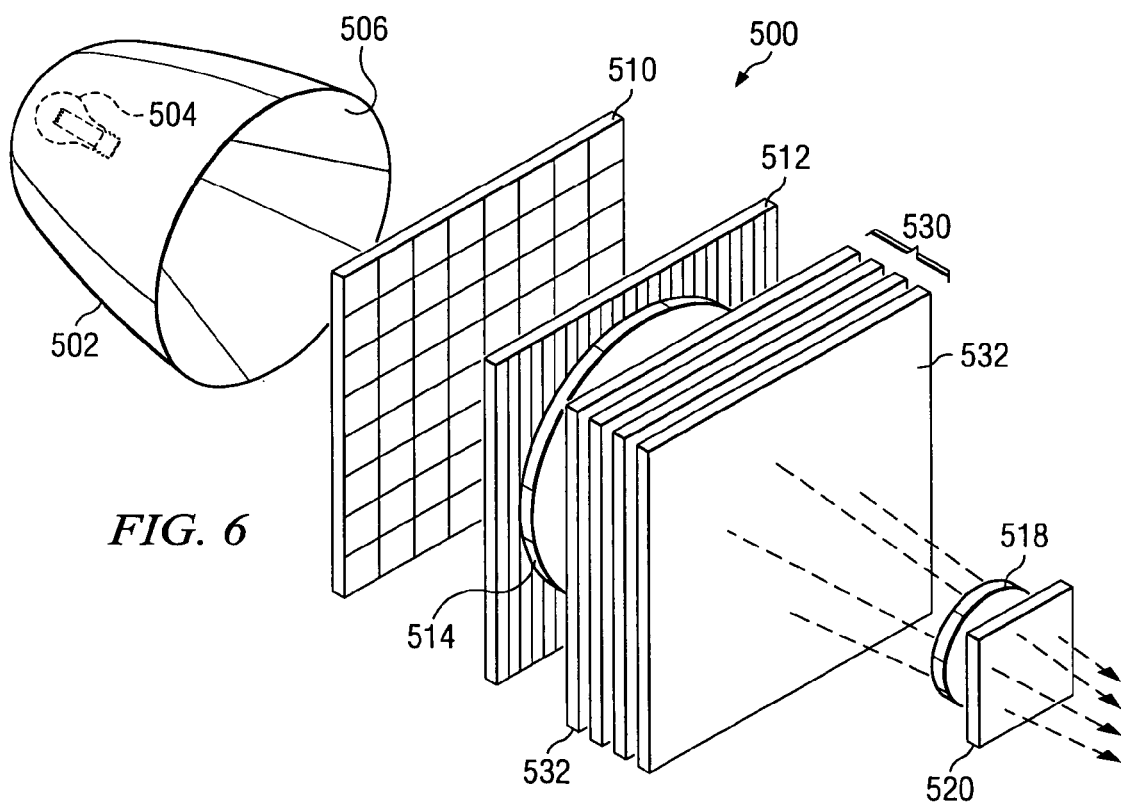
FIG. 6 provides a perspective view of another embodiment of an illumination attenuation system, which utilizes an analog liquid crystal attenuation panel with corrective polymer-based polarization filters.

FIG. 6 illustrates a fourth embodiment of an illumination attenuation system 500, which uses an analog LC attenuation panel 532 with corrective polymer-based polarization filters 530. In this fourth embodiment, the elements comprising the illumination attenuation system 500 share some similarities with the illumination attenuation system 200 of FIG. 3, except that analog LC attenuation panel 532 is used in place of concentric circle panel 230. Accordingly, in this third embodiment, light source 502 is similar to light source 202 of FIG. 3, lens array 510 is similar to lens array 210, etc. To reduce the analog LC panel's 532 size and cost, as well as the amount of space required by this illumination attenuation system 500, analog LC attenuation panel 532 may be placed in the light path just before or after the telecentric field lens 518, and before the polarizer 520.

As mentioned above with reference to analog LC attenuation panel 430 of FIG. 5, at lower intensity settings, analog LC attenuation panel 532 may introduce chromaticity, thereby requiring correction of chromatic levels. Such correction may be achieved by introducing additional components such as retarder-based polarization manipulation elements such as corrective polymer-based polarization filters 530, and in some embodiments, another LC cell (not shown) to provide additional achromatic analog attenuation. Again, the LC component size could be minimized by placing it closer to the panel.

Figure 7:
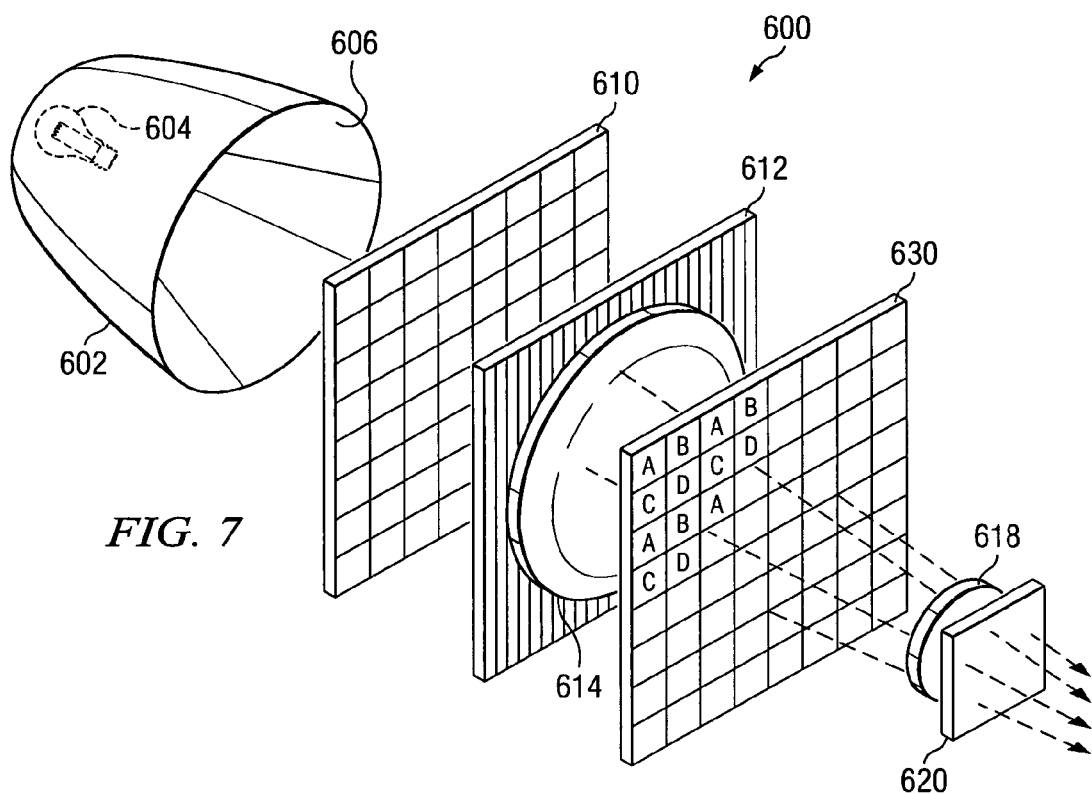
FIG. 7 provides a perspective view of another embodiment of an illumination attenuation system, which utilizes a liquid crystal matrix attenuation panel.

FIG. 7 illustrates a fifth embodiment of an illumination attenuation system 600, which combines an analog attenuation approach with a spatial attenuation approach. In this fifth embodiment, the elements comprising the illumination attenuation system 600 share some similarities with the illumination attenuation system 200 of FIG. 3, except that liquid crystal (LC) matrix attenuation panel 630 is used in place of concentric circle panel 230. Accordingly, in this fifth embodiment, light source 602 is similar to light source 202 of FIG. 3, lens array 610 is similar to lens array 210, etc. Since LC matrix attenuation panel 630 may be used as a spatial attenuator, it is preferably placed sandwiched between PCS 612 and combining lens 614 (not shown in this configuration). Alternatively, LC matrix attenuation panel 630 may be placed at an aperture stop position on the light path between combining lens 614 and field lens 618, however, it will be appreciated that the LC panel 630 may be placed elsewhere on the light path, with some trade-offs being made according to design needs.

LC matrix attenuation panel 630 includes a matrix of coarse pixels that are individually addressable with analog values, providing independent modulating regions. LC attenuation panel 630 can be operated as a user-defined spatial attenuator—the more general extension of the first two embodiments. It can, however, also provide analog achromatic attenuation. By individual analog addressing of coarse pixels, the chromatic behavior of a single shutter can be averaged out, especially if retarder-based polarization corrector films (not shown) are used in conjunction. Although active-matrix addressing could be considered, the high-brightness illumination requirement and the device's overall cost would favor passive addressing. Since the pixel count would be significantly lower than that of a display panel, passive addressing schemes as those used in STN (super twist nematic) LC displays could be employed without requiring the STN's sharp switching characteristic.

Figure 8:
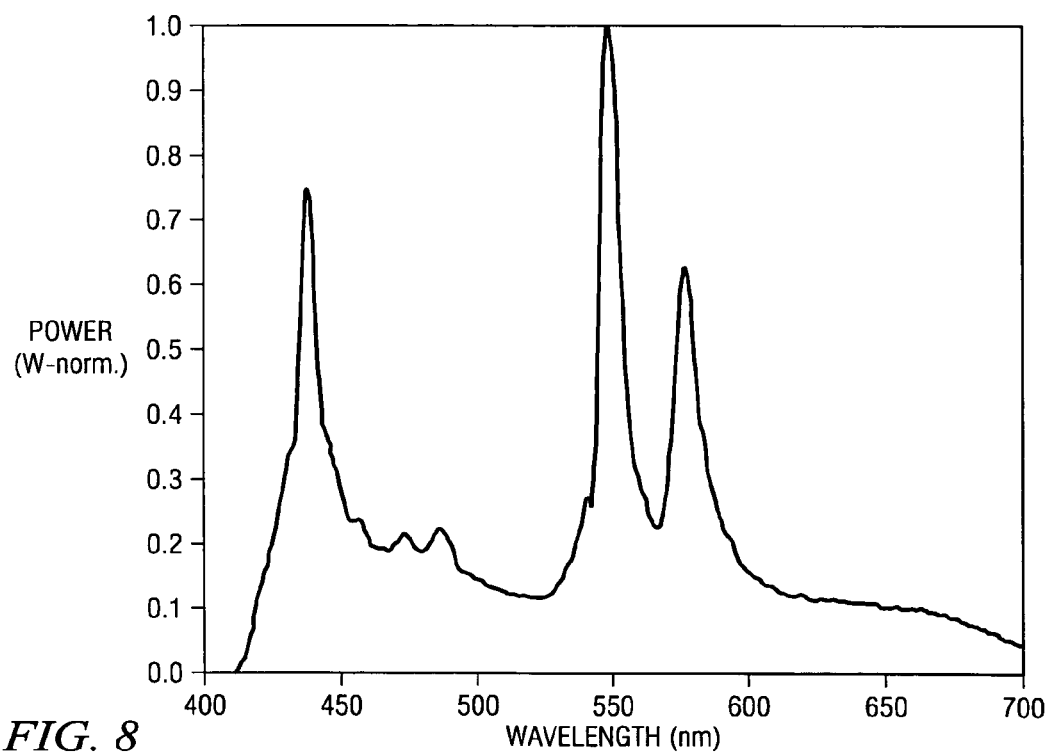
FIG. 8 provides a graph showing the normalized power output of an exemplary UHP lamp through a UV filter for a range of electromagnetic frequencies.

FIG. 8 shows a spectrum of an exemplary UHP lamp (e.g., lamp 204, 304, 404, etc.) through a UV filter. As shown by the spectrum, the light from a UHP lamp is essentially white, the output is somewhat red deficient and green rich. The peaked nature of this spectrum requires precise color management particularly since the yellow 580 nm spike must be almost entirely removed. Although the various embodiments of illumination attenuation systems have so far been described with respect to controlling the illumination output of a single UHP light source, the teachings disclosed herein may be used to control the relative intensities of various color components for a plurality of light sources. For example, color polarization filters may be used with the LC attenuation panels to provide a plurality of color-modifying apertures to separately control primary color components, each of which may control the relative intensities of the primary color component light paths. Such a system is also useful for white-point correction purposes. These primary color component light paths may then be input to a color combiner to provide illumination light. An example of such a color component aperture stop system is provided in U.S. Pat. No. 6,877,865. As one of ordinary skill in the art will recognize, the system in the '865 patent teaches the use of a mechanical aperture, rather than an LC-based attenuation panel, thus an LC-based attenuation panel may be substituted for the mechanical aperture, along with the appropriate polarization optics disclosed herein.

FIGS. 9A to 9C are alternative LC attenuation panels that may be used will an illumination attenuation system (e.g., 200 of FIG. 3) showing concentric shapes, where each concentric shape is defined by an area between an outer polygon and an inner polygon. The outer and inner polygons have a common center.

FIG. 9A shows exemplary concentric shapes in the form of concentric stars. Similar to the concentric circles of the LC attenuation panel 230 of FIG. 3, the outer portions of the panel may be addressed in sequence from the outside to the inside, to provide a variable aperture.

FIG. 9B shows an example LC attenuation panel profile design having concentric squares, which spatially attenuate light equally in the horizontal and vertical direction when portions are configured in the 'black' state. Although not shown, a variation on FIG. 9B may include concentric rectangles, which may spatially attenuate light in the horizontal and vertical directions proportionately to the desired projection design, e.g., for a 16:9 widescreen projection. Additionally, portions may be selectively attenuated to switch between, for example, 16:9 and 4:3 aspect ratio projection modes to optimize an illumination attenuation system to a selected projection mode. Likewise, a variation on the LC attenuation panel 230 of FIG. 3 may include a set of concentric ellipses that are optimized for one or more aspect ratio projection modes.

FIG. 9C illustrates an exemplary attenuation panel design with concentric diamond shapes. As a person of ordinary skill should appreciate, there are many variations of profile designs that may be used with the LC attenuation panel, as well as being incorporated with other optical components in various configurations to result in an illumination attenuation system with similar functionality. Accordingly, the examples of the various embodiments of the LC attenuation panels shown in FIGS. 3 to 9C are not exclusive or limiting, and are merely disclosed as illustrations of the principle that a LC panel can be used to achromatically attenuate light in an illumination system.

Figure 10:
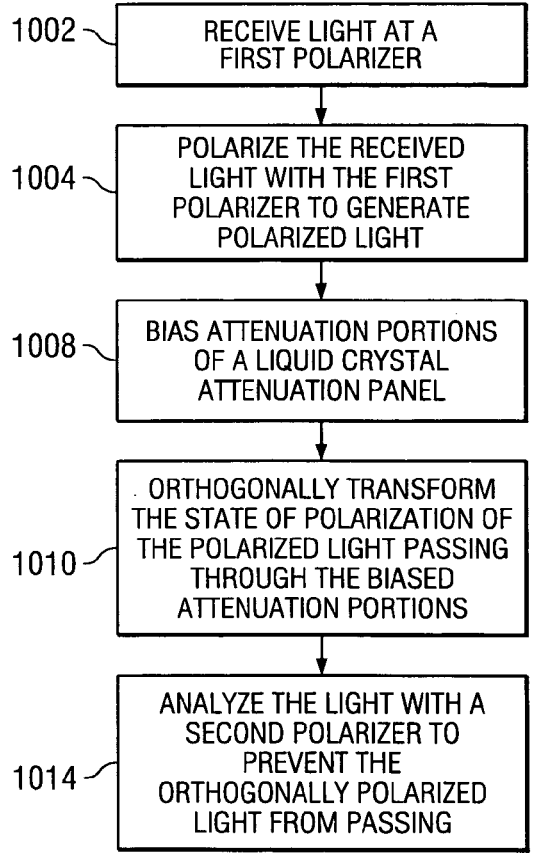
FIG. 10 provides a flow diagram illustrating an exemplary method of attenuating light in an illumination system.

FIG. 10 illustrates an exemplary method of attenuating light in an illumination system. Light is received at a first polarizer at step 1002. Next, the received light is polarized using the first polarizer (e.g., a polarization beam splitter) to generate polarized light, at step 1004. Attenuation portions of a LC attenuation panel are biased, wherein the panel may be positioned at the aperture position, at step 1008. The state of polarization of light passing through the biased attenuation portions may be orthogonally transformed at step 1010. The light from the LC attenuation panel is then analyzed with a second polarizer to prevent the orthogonally polarized light from passing, at step 1014. Accordingly, polarized light that passes through the unbiased portions of the LC attenuation panel is allowed to pass.

Figure 11:
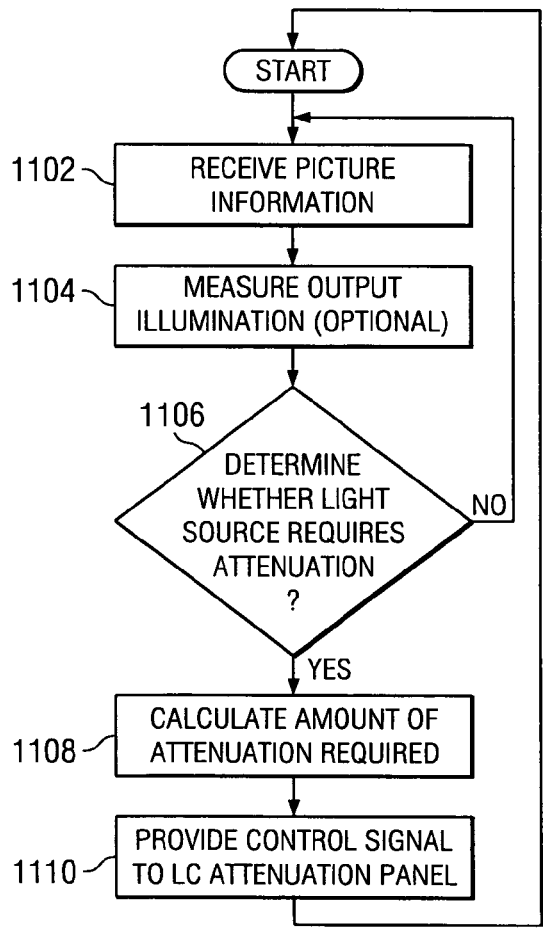
FIG. 11 provides a flow diagram illustrating an exemplary method of controlling the output of an illumination system.

FIG. 11 illustrates an exemplary method of controlling the output of an illumination system. Generally, the method includes receiving picture information at step 1102. In some embodiments, output illumination of the illumination attenuation system may be measured at step 1104. At step 1106 a determination is made whether the light source requires attenuation, taking into account, for example, the contrast and brightness requirements of the picture information, and, as another example, the output illumination measurement. If the light source requires attenuation, then step 1108 includes calculating an amount of attenuation required. Further, if the light source requires attenuation, step 1110 includes providing a control signal to an LC attenuation panel. Such a control signal controls the modulation function of the LC attenuation panel. If the determination at step 1106 does not require attenuation, then the LC attenuation panel may not be modulated.

Having described several embodiments, it will be recognized by those of ordinary skill in the art that various modifications, alternative constructions, and equivalents may be used without departing from the spirit of the disclosed embodiments. Accordingly, the presently disclosed embodiments are therefore considered in all respects to be illustrative and not restrictive. The scope of the invention is indicated by the appended claims rather than the foregoing description, and all changes that come within the meaning and ranges of equivalents thereof are intended to be embraced therein. For example, as used here, illumination attenuation and light attenuation are terms that are used interchangeably.

Additionally, the section headings herein are provided for consistency with the suggestions under 37 C.F.R. § 1.77 or otherwise to provide organizational cues. These headings shall not limit or characterize the invention(s) set out in any claims that may issue from this disclosure. Specifically and by way of example, although the headings refer to a "Technical Field," the claims should not be limited by the language chosen under this heading to describe the so-called technical field. Further, a description of a technology in the "Background of the Invention" is not to be construed as an admission that technology is prior art to any invention(s) in this disclosure. Neither is the "Brief Summary of the Invention" to be considered as a characterization of the invention (s) set forth in the claims found herein. Furthermore, any reference in this disclosure to "invention" in the singular should not be used to argue that there is only a single point of novelty claimed in this disclosure. Multiple inventions may be set forth according to the limitations of the multiple claims associated with this disclosure, and the claims accordingly define the invention(s), and their equivalents, that are protected thereby. In all instances, the scope of the claims shall be considered on their own merits in light of the specification, but should not be constrained by the headings set forth herein.

What is claimed is:

1. A light attenuation system for attenuating light from a light source, the light attenuation system located in the light path of a projection display system ahead of an image modulator, and operable to attenuate the light from the light source according to image characteristics, wherein the image modulator communicates with an image controller in the projection display system that provides the images to be displayed by the projection display system, the light attenuation system comprising:
   an attenuation control input in communication with the image controller;
   a liquid crystal panel operable to modulate light in the light path;
   a liquid crystal panel controller connected to the liquid crystal panel and the attenuation control input, the liquid crystal panel controller operable to control the modulation operation of the liquid crystal panel and to provide attenuation of the light source according to the image characteristics.

2. The light attenuation system of claim 1, wherein the liquid crystal panel comprises at least one liquid crystal attenuating portion, each at least one attenuating portion being selectively operable in an attenuation state or a non-attenuation state, wherein the liquid crystal attenuating portions in the attenuation state polarize light to a first state of polarization.

3. The light attenuation system of claim 1, further comprising a first polarizer in the light path ahead of the liquid crystal panel.

4. The light attenuation system of claim 3, further comprising a second polarizer in the light path after the liquid crystal panel.

5. The light attenuation system of claim 4, wherein the liquid crystal panel comprises a plurality of liquid crystal attenuating portions.

6. The light attenuation system of claim 5, wherein each liquid crystal attenuating portion is selectively operable in an attenuation state or a non-attenuation state.

7. The light attenuation system of claim 6, wherein the liquid crystal attenuating portions in the attenuation state modulate the polarized light to a first state of polarization.

8. The light attenuation system of claim 7, wherein the second polarizer is oriented to prevent light in the first state of polarization from passing.

9. The light attenuation system of claim 7, wherein the second polarizer prevents polarized light with the first state of polarization from passing.

10. The light attenuation system of claim 6, wherein the liquid crystal attenuating portions in the non-attenuation state modulate the polarized light to a second state of polarization.

11. The light attenuation system of claim 6, wherein the liquid crystal attenuating portions in the non-attenuation state pass polarized light without changing the state of polarization.

12. The light attenuation system of claim 6, wherein the polarization of the light passing from the liquid crystal attenuating portions in the attenuated state is orthogonal to the light passing from the liquid crystal attenuating portions in the non-attenuated state.

13. The light attenuation system of claim 4, further comprising a field lens to direct the processed light toward the second polarizer.

14. The light attenuation system of claim 13 wherein the field lens is telecentric.

15. The light attenuation system of claim 3, wherein the first polarizer is a polarization conversion system.

16. The light attenuation system of claim 3, further comprising a first lens array located in the light path between the light source and the first polarizer.

17. The light attenuation system of claim 16, further comprising a second lens array, located in the light path after the first lens array, wherein light from the first lens array is incident on the second lens array.

18. The light attenuation system of claim 16, wherein the aperture position is located at an aperture stop of the illumination system.

19. The light attenuation system of claim 16, wherein the aperture position is located at an aperture stop of the projector.

20. The light attenuation system of claim 1, wherein the liquid crystal panel is located at an aperture position.

21. The light attenuation system of claim 1, wherein the liquid crystal attenuation panel comprises a variable aperture.

22. The light attenuation system of claim 21, wherein the variable aperture comprises a plurality of concentric shapes, wherein each concentric shape is defined by an area between an outer polygon and an inner polygon, wherein the outer and inner polygons have a common center.

23. The light attenuation system of claim 21, wherein the variable aperture comprises a plurality of annuli, wherein each annulus is defined by a region lying between a first concentric circle and a second concentric circle, wherein the first concentric circle has a radius greater than the second concentric circle.

24. The light attenuation system of claim 21, wherein the variable aperture comprises patterning operable to attenuate skew rays in 135°/450° azimuthal incident planes.

25. The light attenuation system of claim 1, wherein the liquid crystal attenuation panel is operable to uniformly process the polarization of light passing therethrough.

* * * * *